April 12, 1966 S. F. SYLVESTER 3,245,173
LOBSTER POT
Filed June 3, 1964
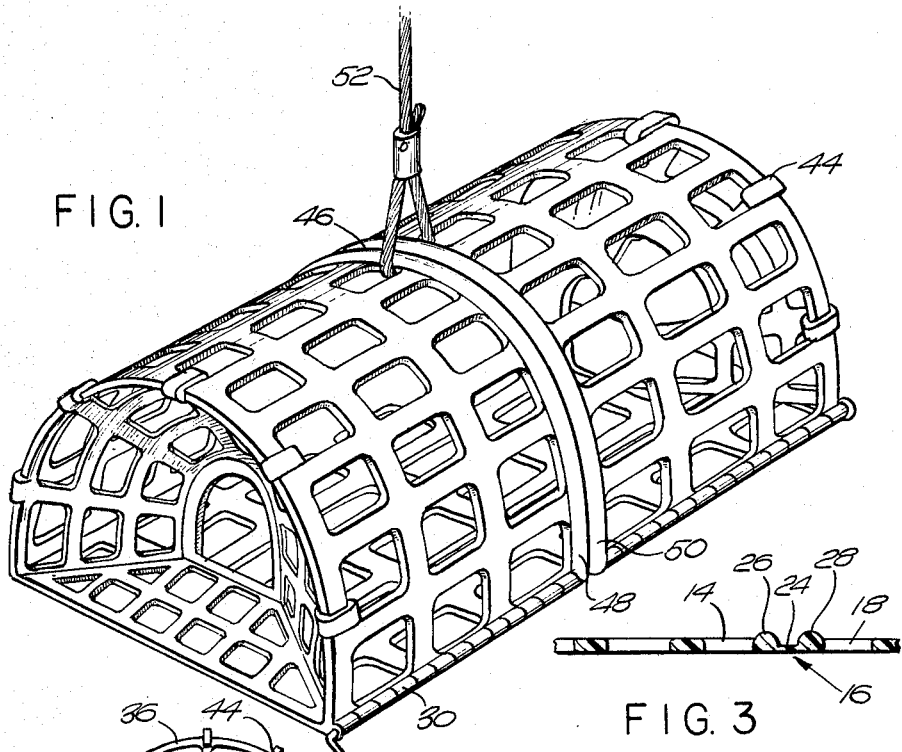
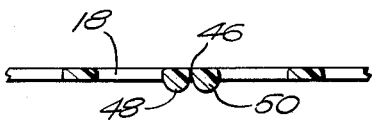
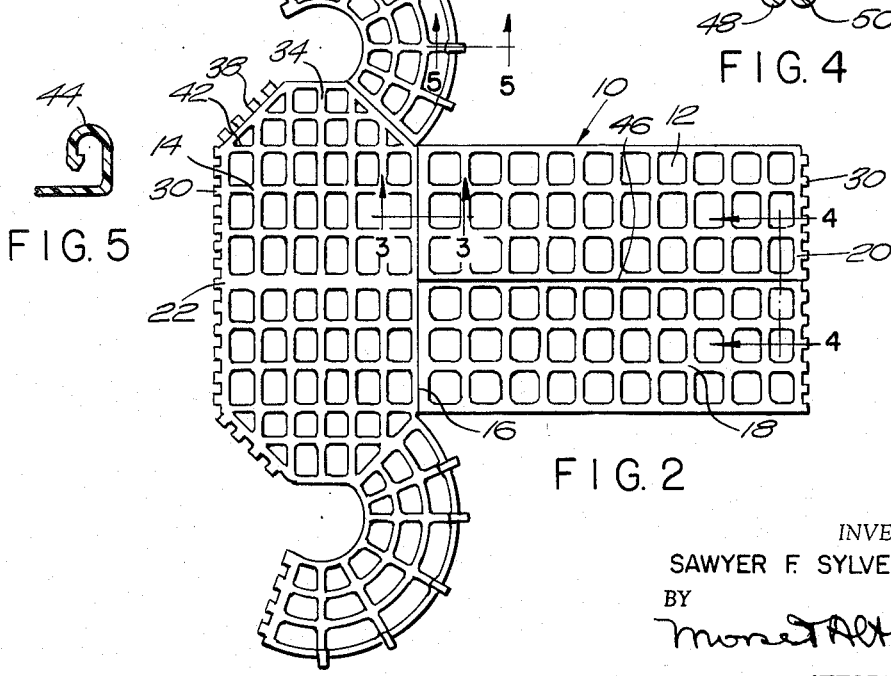
INVENTOR.
SAWYER F. SYLVESTER
BY
ATTORNEYS United States Patent Office 3,245,173
Patented Apr. 12, 1966

3,245,173
LOBSTER POT
Sawyer F. Sylvester, 23 Hillcrest Ave., Melrose, Mass.
Filed June 3, 1964, Ser. No. 372,256
3 Claims. (Cl. 43—65)

This invention relates to improvements in lobster pots, that is, the cages or traps which are customarily used for catching lobsters. Heretofore, lobster pots have generally been made chiefly of wooden laths with cord netting at the ends having a central opening large enough to admit a lobster. These cages are baited and ballasted to make them rest on the floor of the ocean or bay where lobsters are to be found. To each lobster pot a buoy is connected by a line long enough to reach to the surface of the water. The pots must be hauled up, preferably daily, to recover the lobsters therein and to rebait the pot if necessary. The pots get water-logged and heavy. When it becomes advisable to change the location of a pot or to take it ashore for repairs or temporary storage, it occupies considerable space on a boat so that the number of pots that can be taken aboard the average lobstering boat is qiute limited.

It is an object of the present invention to provide a lobster pot which can be quickly and inexpensively made in the form of a flat blank capable of being readily formed into the shape of an operational lobster pot, and of being restored to its flat condition for storage or shipping. Another object of the invention is to provide a lobster pot which is light in weight when out of the water, which does not get water-logged and which needs relatively little ballast to keep it submerged. Other valuable features of the improved lobster pot will be apparent from the following description thereof and from the drawing, in which:

FIGURE 1 is a perspective view of an assembled lobster pot embodying the invention;

FIGURE 2 is a plan view, on a smaller scale, of a blank to be made up into a pot such as is shown in FIGURE 1; and FIGURES 3, 4 and 5 are fragmentary sections on the lines 3—3, 4—4 and 5—5, respectively, of FIGURE 2, and on a larger scale.

While lobster pots now in general use vary to some extent in shape and size, one widely used style of pot has a plane bottom 32″ long and 24″ wide with an arched top extending to a height of 17″ above the bottom. The bottom and top are generally made of wooden lath on wooden frames. The ends of the pot are cord netting with a central aperture large enough to permit the passage therethrough of a grown lobster.

A planar blank 10 of flexible sheet material which can be assembled into such a shape is illustrated in FIGURE 2 of the drawing. The blank is reticulated or made with a number of apertures 12 of any desired size and shape but not large enough to permit the passage of a grown lobster therethrough. One portion 14 of the blank serves as the rectangular bottom of the pot. Integral with this portion along one side edge 16 thereof is another rectangular portion 18 which is adapted to be arched over the bottom 14 so that its free end edge 20 can be detachably secured to the other side edge 22 of the bottom 14. Along the side edge 16 the blank is thinned as at 24 to facilitate a right-angled bend between the bottom 14 and the arched portion 18, this thinned strip being flanked by beads 26, 28 for stiffening. Any suitable fastening means may be employed to secure the edge 20 to the edge 22. As shown, hinge knuckles 30 are formed on these edges. When the edges are brought together a rod or pin 32 is threaded through these knuckles.

The end walls of the pot are preferably made integral with the end edges of the bottom portion 14. Each end wall comprises a planar trapezoid portion 34 from a slant side of which an arcuate portion 36 extends. Hinge knuckles 38 on the other slant side of the portion 34 cooperate with hinge knuckles 40 on the free end edge of the arcuate portion 36 to join the knuckled edges when a pin is threaded through the knuckles after these edges are brought together. When these edges are brought together, the portions 34 and 36 take an approximate frusto-conical form with a central aperture as indicated in FIGURE 1. When these ends are secured together, the frusto-conical wall is swung about the edge 42 into the end of the arched wall and detachably secured therein by suitable fastening elements such as clips 44 which may conveniently be molded on the outer edge of the arcuate portion 36. In shaping the end walls, care must be taken to bow the arcuate portion 36 in such a way that the resulting wall is concave in the end of the pot and not convex. As indicated in FIGURE 2, the end walls of the pot may be similar to each other and assembled in the same way.

For access to the interior of an assembled pot, instead of providing the customary small door, the arched portion 18 is centrally split as at 46 from near the edge 16 to near the edge 20 so that when the pot is assembled, this split will be in a plane perpendicular to the long axis of the pot. Beads 48, 50 are preferably provided along the split to reinforce the edges at the split so that the haul line 52 can serve to hold the split closed as well as to provide means for hauling the pot to the surface. The flexibility of the plastic sheet material makes it easy to pull the sides of the split away from each other when the line 52 or other fastener is removed.

When it is desired to disassemble a pot for shipment or storage, removal of the hinge pins will permit the pot to be restored to the flat blank form shown in FIGURE 2. Many pots can thus be piled in a relatively small space.

I claim:

1. A lobster pot composed of flexible plastic sheet material having apertures therein too small for the passage of a grown lobster therethrough, said pot having a planar bottom and an arched top integral with said bottom along one side edge thereof and detachably secured to the other side edge of the bottom, said pot having end walls integral with said bottom along the end edges thereof and detachably secured to the arched edges of said top, each said end wall having an inwardly tapered planar bottom and an inwardly tapered concave portion having one edge formed integral with one edge of said tapered bottom and its opposite edge releasably secured to the opposite edge of said tapered bottom to provide an aperture large enough for the passage of a grown lobster therethrough.

2. A lobster pot as described in claim 1, said arched top being centrally split in a plane perpendicular to the long axis of the pot and extending substantially to the plane of said pot bottom.

3. A lobster pot as described in claim 1, said detachably secured pot bottom and top edges having aligned hinge knuckles thereon with a pin threaded through said knuckles.

References Cited by the Examiner
UNITED STATES PATENTS

| | | | |
|---|---|---|---|
| 599,806 | 2/1898 | Wisner | 43—65 |
| 850,123 | 4/1907 | Algate | 43—65 |
| 1,187,359 | 6/1916 | Martin | 43—65 |
| 1,607,443 | 11/1926 | Cormier | 43—65 |
| 2,076,972 | 4/1937 | Tucker | 43—65 |
| 2,739,734 | 3/1956 | Pugh | 220—83 |

SAMUEL KOREN, Primary Examiner.
ABRAHAM G. STONE, Examiner.